Patented Dec. 22, 1931

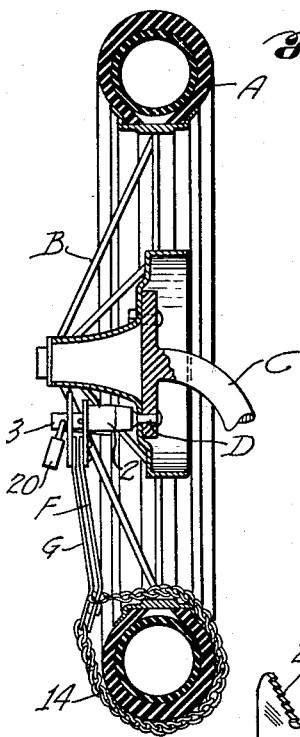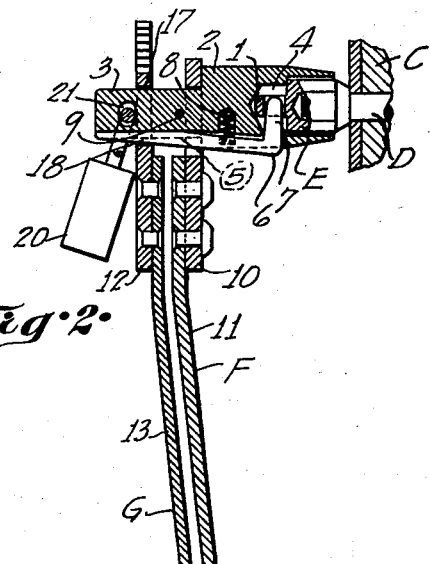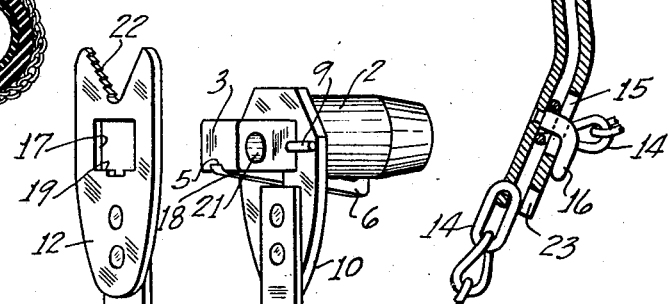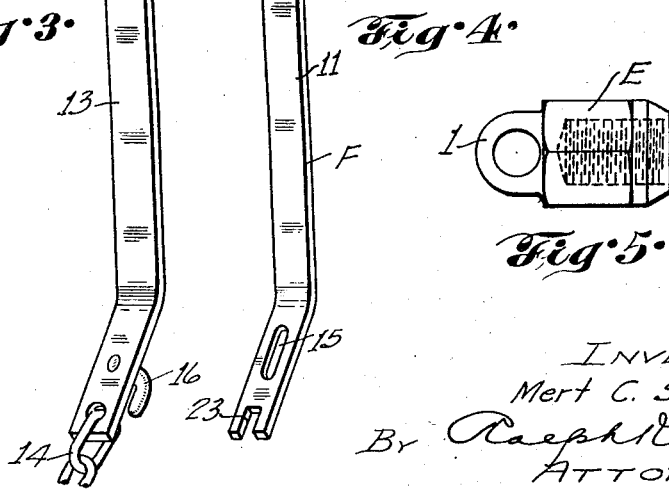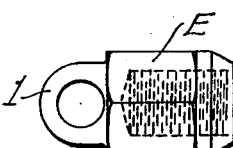

1,837,683

UNITED STATES PATENT OFFICE

MERT C. SKAGGS, OF CROCKER, MISSOURI, ASSIGNOR OF ONE-HALF TO CYRUS MALLETTE, OF CROCKER, MISSOURI

SPARE TIRE AND WHEEL LOCK

Application filed November 25, 1929. Serial No. 409,619.

This invention relates to spare tire and wheel locks and has as a prime object the provision of a device for efficiently locking a spare tire to its wheel and the wheel to a spare-wheel carrier.

My invention has for another object the provision of a spare-wheel and tire lock so constructed that when not in use as a lock, portions of the device may be conveniently employed as tire or wheel changing tools.

My invention has for a further object the provision of a device of the type and for the purpose which may be readily and cheaply manufactured, which may be readily operatively manipulated, and which is sturdy and durable in structure.

And with the above and other objects in view, my invention resides in the novel features of form, construction, arrangement, and combination of parts hereinafter described and pointed out in the claims.

In the accompanying drawings,—

Figure 1 is a diametrical sectional view of a spare wheel and its carried tire, as mounted on a spare wheel carrier of an automotive vehicle, illustrating a lock of my invention operatively associated therewith;

Figure 2 is an enlarged longitudinal sectional view of the lock;

Figure 3 is an enlarged perspective detail view of the retaining-member of the lock;

Figure 4 is an enlarged perspective detailed view of the handled-wrench member of the lock; and Figure 5 is an enlarged side view of the co-operating spare-wheel carrier nut.

Referring now more in detail and by reference characters to the drawings, which illustrates a preferred embodiment of my invention, A designates a spare-tire mounted on a spare-wheel B, the latter, in turn, being shown as mounted on a spare-wheel carrier C of a standard type, forming part of which is a plurality of bolts adapted for engagement with the hub of wheel B for supporting the latter on the carrier C. One of such bolts, as, for instance, bolt D, is threaded at an end for co-operation with the wheel-securing hexagonal or other suitably contoured nut E of my invention, which, for purposes shortly appearing, has an endwise presented eye 1.

F designates what I may describe as the combined wrench and wheel-securing member of the lock. This member F includes a wrench-head 2 generally of cylindrical formation, but provided longitudinally with a reduced portion or extension 3 rectangular or cut of round in section, the head 2 having at its other end a counter-bored end-recess or socket 4 of suitable depth to fit over and enclose the nut E and its eye 1 and of corresponding configuration for turning engagement with said nut, as best seen in Figure 2.

Loosely disposed for swingable movement principally in a longitudinal slot, as at 5, provided in the wrench-head 2 and its extension 3, is a dog 6 provided at an end with an inturned or lateral finger 7 presented through a suitable opening formed in the wall of the socket-recess 4 for co-operative engagement with the eye 1 of the nut E, as soon appearing, a suitable spring 8, seated between the dog 6 and the wrench 2, being adapted to normally yieldingly withdraw the finger 7 from the nut-eye 1 in order that the wrench 2 may be engaged or disengaged from the nut E.

Suitably slotted to seat on the wrench-extension 3 and accommodate the dog 6 and permanently, as by a pin 9, fixed in abutting position against the enlarged portion of the wrench-member 2, as best seen in Figure 2, is a plate 10, riveted or otherwise permanently, in turn, fixed to which, and laterally presented with respect to the wrench 2, is a rigid metallic strip 11 adapted to provide a handle for the wrench-head 2 and so elongated and constructed, as shown, as to depend, when the wrench-head 2 is in securing-engagement with the nut E, over the wheel B with its free lower end adjacent the tire A, as seen in Figure 1.

The companion or retaining-member G of the lock is generally of complementary construction to the handled wrench-member F and similarly includes a plate-section 12, permanently fixed to which at an end is a rigid metallic strip-portion 13 substantially of the same length and contour as the strip or handle 11 of member F, and which is adapted, when the retaining-member G is in engagement with the wrench-head 2, as presently more fully appears and as shown in Figure 2, to approximately register with the strip 11.

Adapted for co-operation with the lower end of the strip or handle 11, is a preferably flexible girth-member or chain adapted to embrace the tire A and the rim of the wheel B in such manner as to prevent turning movement of the wrench 2, as well as also prevent the removal of the tire A from the wheel B even though the tire be deflated for such purpose. For such effect, one member of the girth member 14 is permanently attached to the free end of the retaining or companion strip 13, while the other end of the chain 14 is adapted to be brought around the tire A and the rim of the wheel B for positioning the end link thereof in registration with a slot 15 provided in the adjacent end of the strip 11.

A rigid hook member 16 carried by the retaining strip 13 is then inserted through said end-link of the chain 14 and through the slot 15 in such manner as, on endwise shifting movement of the strip 13 with respect to the strip 11, to both secure the strips 11 and 13 rigidly together at their lower end and the free end of the chain 14 therebetween, as best seen in Figure 2. The plate 13 of member G is provided with a suitable aperture 17 adapted to fit over and receive the wrench-extension 3 in such manner that the retaining member G may be so slidingly engaged in co-operation with the wrench-member 2 when the hook 16 is endwise shifted in the slot 15 for securing the chain 14 to the handle 11, as set forth.

The dog 6 is, as described, principally shiftable in the longitudinal slot 5 in the wrench-head 2, the slot 5 extending preferably through the end of the extension 3 for accommodating swinging or shiftable operative movement therein of a wedge-shaped key-like portion 18 of the dog 6 tapering in endwise presentation relatively to the extension 3 in such manner that, as the retaining member G is slid or shifted over the wrench extension 3, a notched wall 19 of the aperture 17 will operatively engage said wedge-like portion 18 of the dog 6, causing the same to seat in the slot 5 and the finger 7 to enter into the eye 1 of the engaged nut E, thereby securing the wrench-head 2 to the nut E at the same time that the hook 16 secures the girth member 14 to the handle or strip 11.

For locking the several parts in their described positions, it is now only necessary to insert the shackle of a padlock 20 in an aperture 21 provided suitably in the wrench-extension 3 for the purpose of preventing displacement of the adjacent end of the retaining member G from the wrench-head 2, the other end of the member G being correspondingly prevented from displacement from the member F by means of the interengagement between the hook 16 and the wrench-handle or strip 11.

Thus the device is adapted to efficiently secure the wheel assembly as a whole against unauthorized removal from the carrier C and at the same time efficiently secure the tire A, whether inflated or deflated, to the wheel B, removal of the device from engagement with the wheel and tire being readily permitted on removal of the padlock 20 and reversal of the operations described.

And I may add that, when not employed as a locking device, several of the parts of the lock may be usefully employed as so-called tire tools, the handled-wrench member 2 being adapted for use as a socket-wrench for mounting or demounting the spare wheel B, as will be understood, and the parts F and G forming convenient tools for facilitating mounting or demounting of the tire A. The member G is also well adapted, by reason of its aperture 17, as a wrench, and in addition, I also provide a so-called alligator jaw, as at 22, in the wrench engaging end of the retaining member G, and in the girth member engaging end of the handle 11, I provide a square jaw 23, all for purposes of facilitating the useful employment of the device about an automobile, especially as in changing tires.

The tool and its parts have been found exceedingly efficient in the performance of their intended functions, and it is to be understood that changes or modifications in the form, construction, arrangement, and combination of the several parts of the device may be made and substituted for those herein shown and described without departing from the nature and principle of my invention.

Having thus described my invention, what I claim and desire to secure by Letters Patent is:

1. In a spare wheel lock, in combination, a carrier-nut having an endwise presented eye, a socket-member adapted to engagingly fit over the carrier nut and its eye, and means including an eye-engaging dog mounted for pivotal movement on the socket-member for detachably securing the socket-member to the carrier-nut.

2. In a spare wheel lock, in combination, a carrier nut having an endwise presented eye, a socket-member adapted to engagingly fit over the carrier-nut and its eye, and means for detachably securing the socket-member to the nut, said means including a dog shiftable upon the socket-member, a lateral finger on the dog adapted for engagement with the eye of the nut, and a member adapted to fit upon the socket member for retaining the finger of the dog in engagement with the eye of the nut.

3. In a spare wheel lock, in combination, a carrier-nut having an endwise presented eye, a socket-member adapted to engagingly fit over the carrier-nut and its eye, and means for detachably securing the socket-member to the nut, said means including a yieldingly swingable dog upon the socket-member, a lateral finger on the dog adapted for engagement with the eye of the nut, a member adapted to fit upon the socket-member for retaining the finger of the dog in engagement with the eye of the nut, and a key-operable lock adapted for engagement with the socket-member over the retaining-member for preventing unauthorized removal of the retaining-member.

4. In a mounted spare-tire lock, in combination, a flexible member adapted to embracingly encircle the tire and rim of a spare-wheel, a co-operating pair of rigid strips having connection with said member for securing the same about the tire and rim, and means for locking said strips together in registration along a side of the wheel.

5. In a mounted spare-tire lock, in combination, a pair of co-operating rigid strips, a flexible member attached to one of the strips and adapted to embracingly encircle the tire and rim of a suspended spare-wheel, co-operating means on the strips for securing the free end of said member to the other of said strips, and means for locking said strips together in registration along a side of the wheel.

6. In a mounted spare tire lock, in combination, a first rigid strip, a co-operating second rigid strip longitudinally slotted at an end, a flexible member attached to an end of the first strip and adapted to embracingly encircle the tire and rim of a suspended spare-wheel, a hook on the first strip adapted for engagement with the flexible member and with the second strip at its said slot for securing the flexible member to the second strip and about the tire and rim, and means for locking said strips together in registration along a side of the wheel.

In testimony whereof, I have signed my name to this specification.

MERT C. SKAGGS.